United States Patent [19]

Colombo

[11] Patent Number: 4,741,234

[45] Date of Patent: May 3, 1988

[54] COMPACT KNIFE UNIT FOR SLITTING A WEB

[76] Inventor: Antonio P. Colombo, Via Lomeni 4, Magenta, Milan, Italy

[21] Appl. No.: 812,767

[22] Filed: Dec. 23, 1985

[30] Foreign Application Priority Data

Jul. 9, 1985 [IT] Italy .............................. 21490 A/85

[51] Int. Cl.[4] .......................... B23D 19/00; B26D 1/14

[52] U.S. Cl. ........................................ 83/481; 83/482; 83/495; 83/505; 83/508.2; 83/563; 83/698

[58] Field of Search ................. 83/481, 482, 495, 505, 83/698, 563, 503, 508.2; 403/324, 328

[56] References Cited

U.S. PATENT DOCUMENTS

| | | | |
|---|---|---|---|
| 821,681 | 5/1906 | Vandermark | 83/478 X |
| 3,185,010 | 5/1965 | Printz et al. | 83/482 |
| 3,682,027 | 8/1972 | Insolio et al. | 83/481 X |
| 3,977,284 | 8/1976 | Mastriani et al. | 83/495 |
| 4,161,898 | 7/1979 | Wingen | 83/171 |
| 4,362,415 | 12/1982 | Metz et al. | 403/328 X |
| 4,438,673 | 3/1984 | Noffke et al. | 83/482 X |

*Primary Examiner*—E. R. Kazenske
*Assistant Examiner*—Scott A. Smith
*Attorney, Agent, or Firm*—Cushman, Darby & Cushman

[57] ABSTRACT

A slim knife unit includes a guide member having an L-shaped body which supports an elongated fluid actuator comprising a piston connected by piston rods to a base member having a sliding track connection to a removable knife holder. The knife holder has spaced walls defining a slot which receives a circular knife supported by a bearing mounted on a spacer bushing clamped between the walls by a center support screw. The guide member has a linear track which cooperates with the rods to guide the knife holder, and a releasable latch secures the knife holder to the base member. The guide member also has a linear track which guides a clamp member movable by a screw for securing the knife unit to a support bar.

29 Claims, 3 Drawing Sheets

COMPACT KNIFE UNIT FOR SLITTING A WEB

BACKGROUND OF THE INVENTION

This invention refers to a compact knife unit, and is directed in particular to a pressure cutting unit in cutting machines for slitting sheets or webs of flexible material into strips, which require a high cutting precision which must be kept within very close tolerances.

In the slitting of a flexible web of material such as a web of paper, film, fabric or the like, it is common to use a series of compact or narrow slitting units, for example, of the general type disclosed in U.S. Pat. No. 3,977,284. In such a unit, a cast or fabricated metal body supports a knife holder for linear movement, and the knife holder has a slot for receiving a circular knife supported for rotation by a center shaft or pin. An air actuated piston moves the knife holder in a linear direction against a set of springs to press the circular knife into engagement with the web which is directed around a backup roll. The knife slitting units are individually clamped to a dovetail-shaped support bar and are sometimes positioned in closely spaced or adjacent relation in order to slit the web into narrow strips. The knife units currently in use, present a very low cutting precision, since it is not possible to control the cutting plane of the knife within close tolerances, as a result of the supporting system. Furthermore, it has been found desirable to provide for replacing a circular knife when the cutting edge becomes dull without removing the knife unit from the support bar. As shown in the above mentioned patent, the end portions of the shaft or pin supporting the knife are retained within slots defined by spring fingers formed as part of the knife holder. When it is desired to replace the knife, the opposite ends of the pin are pulled from the slots by deforming the spring fingers, and a new or resharpened knife is inserted into the knife holder with the support pin snap-fitting into the slots. Therefore, the spring fingers and the support of the knife by knife holders presently in use do not provide for a rigid and precision support for the knife due to the elasticity of the spring fingers and wear; if the spring fingers are made too rigid, it is difficult to remove and replace a knife.

For this reason, it is difficult to achieve the correct positioning of the knife unit, moreover, the operation of removing and repositioning a knife unit is very difficult to carry out on a cutting machine, due to the closeness of adjacent knife units. Consequently, the use of pressure knife units is not recommended and they are very rarely utilizable for the high-precision cutting of web materials used for technical purposes, for example, for slitting magnetic recording tapes, or tapes for computer printing units.

It has also been found desirable to minimize wear between the relative movable components or parts of the knife unit after extended use of the unit so that the circular knife does not wobble and its cutting edge remains precisely in track to assure close cutting tolerances. Such tolerances are especially important when the web is being slit into narrow strips each having a width within close tolerances.

SUMMARY OF THE INVENTION

The present invention is directed to an improved compact web slitting knife unit of the general type disclosed in the above mentioned patent and which also provides for a rigid precision support for the circular slitting knife in addition to convenient and easy removal and replacement of the slitting knife with either a new or a resharpened knife. The knife unit of the invention also minimizes wear on the moving components and provides for precision support and guidance of the knife to assure close cutting tolerances. In addition, the knife unit of the invention provides for accomodating support bars of various widths and for localized heating of the knife and knife holder when it is desired to provide for hot cutting of a web.

Other features and advantages of the invention will be apparent from the following description, the accompanying drawing and the appended claims.

DESCRIPTION OF A PREFERRED EMBODIMENT

Figure 1:
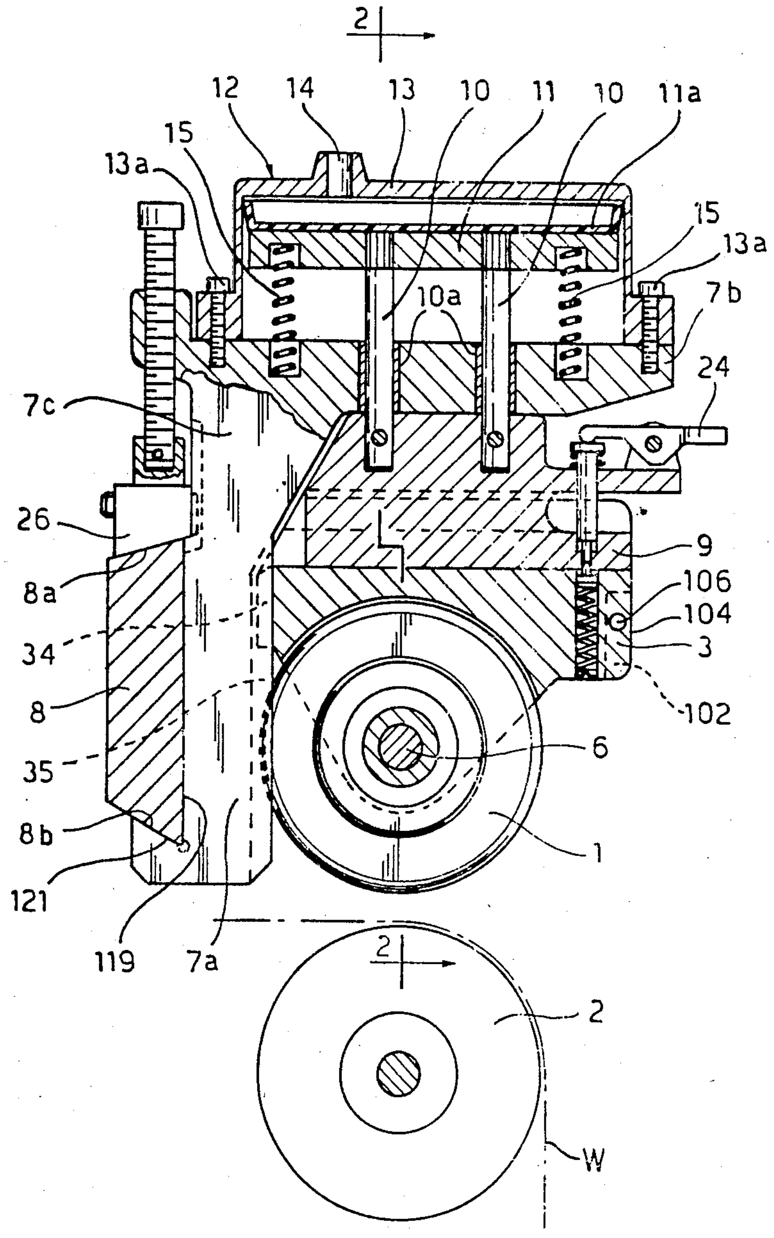
FIG. 1 shows a partially cutaway overall view of the knife unit, constructed in accordance with the invention.

Referring to the drawings, the knife unit substantially comprises a circular cutting knife 1, in the form of a disk whose cutting edge is pushed against a flexible material W to be slit on a back up roll which is made to rotate by means of a motor-driven control, not shown, acting to rotate the circular knife 1.

Figure 2:
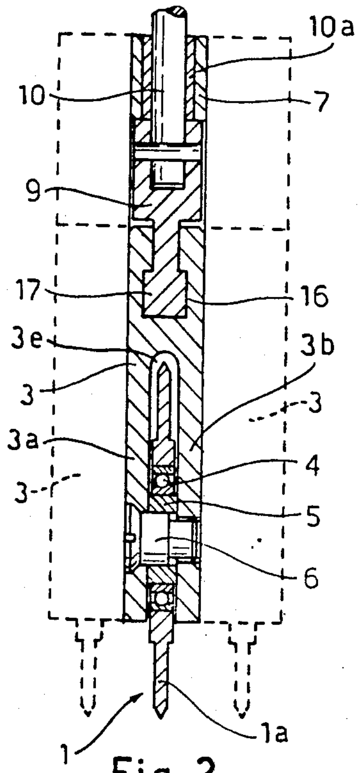
FIG. 2 is a cross-sectional view taken on the line 2—2 of FIG. 1.

The circular knife 1 is idly rotating in a knife holder 3, removably connected to a supporting guide member 7 of a support assembly having flat lateral surfaces spaced apart by a distance corresponding to the width of the strips of material cut from web W, due to the fact that several adjacent knife units are provided for each cutting machine, as shown schematically in FIG. 2.

Figure 3:
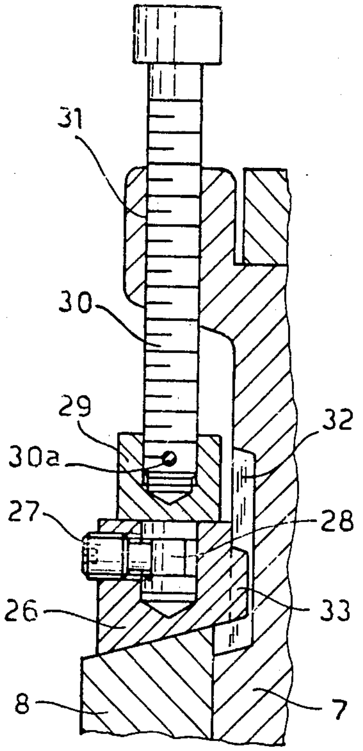
FIG. 3 is an enlarged cross-sectional view of a detail of the previous FIG. 1.

More particularly, the web slitting knife unit includes an L-shaped cast metal body or guide member 7 having leg portions 7*a* and 7*b* connected by a corner portion 7*c* having an inclined surface. The leg portion 7*a* defines a recess 119 with an undercut surface 121 for receiving a dovetail-shaped support bar 8 on which a series of the knife units 10 are mounted. One edge 8*b* of the support bar 8 is engaged by the tapered surface 121, and the opposite edge 8*a* of the bar 8 is engaged by a non-rotating clamping member 26 (FIG. 1, 3) which receives a spool-like pin 28 as detailed in FIG. 3. The pin 28 forms part of a fitting 29 which receives the forward end of an elongated socket head screw 30 extending through a threaded hole 31 in a rear protrusion of the corner portion 7*c* of the body 7. A cross pin 30*a* secures the fitting 29 to the screw 30 so that the fitting 29 rotates with the screw. A set screw 27 is threaded into the clamping member 26 and projects into a circumferential groove within the pin 28 to provide for axial movement of the clamping member 26 with the screw 30 and for relative rotation. The clamping member 26 has a key portion 33 which projects into a slot 32 formed within the leg portion 7*a* of the body 7 to prevent rotation of the clamping member 26 and for guiding the clamping member along a linear path when the screw 30 is being tightened to clamp the body 7 to the support bar 8.

A fluid or air actuator 12 is supported by the leg portion 7*b* of the body 7 and includes an elongated housing 13 having base flanges which are secured to the body 7 by screws 13*a*. The housing 13 has an inlet 14 for receiving pressurized air from an air supply line and encloses an elongated piston 11 which carries a cup-shaped sliding seal element 11*a* secured to the piston by cement. The piston 11 is connected for linear movement within the housing 13 to a pair of parallel spaced connecting rods 10 which are precision ground and extend through corresponding tubular bearings 10*a* mounted within holes in the body portion 7*a*. A pair of compression springs 15 normally urge the piston 11 to its retracted position as shown in FIG. 1.

Figure 4:
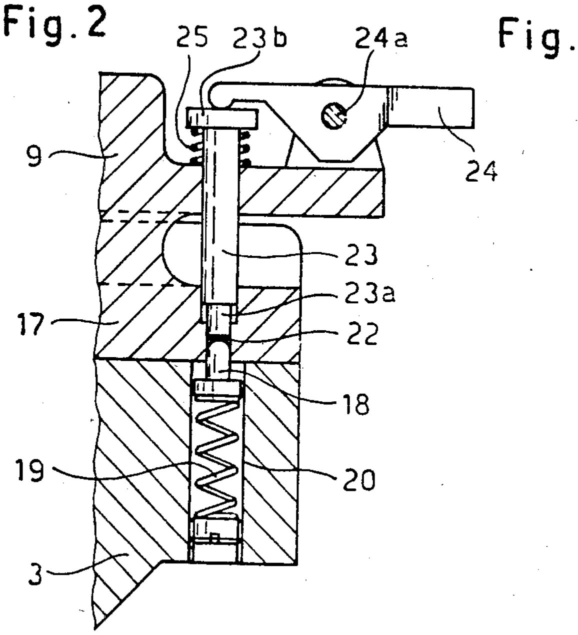
FIG. 4 is an enlarged cross-section of a further detail of the previous FIG. 1.

An intermediate knife support base member 9 (FIG. 1) is mounted on the outer end portions of the connecting rods 10 and is secured by corresponding cross pins so that the intermediate base member 9 moves in a linear direction, along said slitting plane, with the piston 11 and the connecting rods 10. The base member 9 includes a projecting track or key portion 17 (FIG. 2) which slidably supports the knife holder 3 having an undercut slot 16 receiving the key portion 17 to provide for precise sliding movement of the knife holder 3 relative to the base member 9 and in a direction perpendicular to the movement of the base member 9 and to the shaft of knife 1. In its operative position, the knife holder 3 is latched or locked to the intermediate base member 9 by a bolt or pin 18 (FIG. 4) which is urged outwardly by a compression spring 19 confined within a hole 20 in the knife holder 3. The pin 18 is received within a mating hole 22 formed within the base member 9. The hole 22 is also adapted to receive the cylindrical tip 23*a* of a latch release pin 23 supported for axial movement within the base member 9. The release pin 23 has a head 23*b* which is engaged on one side by a compression spring 25 and on the other side by a release lever 24 pivotably supported by a cross pin 24*a*. When the release lever 24 is pivoted counterclockwise (FIG. 1,4), the release pin 23 depresses or forces the tapered lock pin 18 from the tapered hole 20 so that the knife holder 3 may be shifted on the support track or key portion 17.

As shown in FIGS. 1 and 2, the knife holder 3 includes parallel spaced walls 3*a*, 3*b* which define therebetween a slot 3*e*; the circular slitting knife 1 has a thinner outer portion 1*a* with a bevelled peripheral portion 1*b* forming a sharp peripheral cutting edge which defines the slitting plane. The circular knife 1 is supported for rotation within the slot 3*e* by an anti-friction bearing 4 mounted on a spacer bushing 5 defining a rotational shaft or spindle positioned between the walls 3*a*, 3*b*. A flat headed screw 6 extends through the spacer bushing 5 and rigidly connects the side walls 3*a*, 3*b* in order to clamp the spacer bushing 5 and the inner race of the bearing 4 between the side walls 3*a*, 3*b* when the screw 6 is tightened. As shown in FIG. 2, the length of the screw 6 is the same as the overall width of the knife holder 3 so that the screw does not project beyond the outer parallel side surfaces of the knife unit. The bushing 5 is firmly fitted on the screw 6, the bearing 4 is tightly fitted on the bushing 5, and the knife 1 is tightly fitted on the bearing 4 so that the knife 1 is supported for precision rotation with only a small clearance in the order of 0.001 inch between the knife 1 and the inner surfaces of the walls 3*a*, 3*b*.

The front end portion of the knife holder 3 has cavities 102 on opposite sides to form a center web portion 104 which has a cross hole 106. The rear end portion of the knife holder 3 has a center key portion 34 which projects into a slot 35 formed within the body leg portion 7*a*. The key 34 has a close fit within the slot 35 so that the key and slot form a precision guide for the knife holder 3 and cooperate with the linear movement of the rods 10 within the bearings 10*a* to assure precision linear movement of the knife holder 3 and the knife 1 without any wobble or play.

When it is desired to use a web slitting knife unit the lower leg portion 7*a* of the body 7 is mounted on the dovetail support bar 8, and the screw 30 is tightened so that the body 7 is firmly clamped to the support bar. A controlled fluid or air supply line (not shown) is connected to the inlet 14, and a predetermined air pressure is applied against the piston 11 within the housing 13. The base member 9, knife holder 3 and knife 1 are extended in a linear direction until the cutting edge 1*b* engages the web W supported by the back-up roll 2 for the slitting operation. When the air pressure against the piston 11 is released, the springs 15 retract the piston and the connected base member 9, knife holder 3 and knife 1 to their retracted positions, as shown in FIG. 1.

After an extended period of use and it is desired to sharpen the knife 1 or replace the knife, lever 24 is pivoted counterclockwise (FIG. 4) to release the latch pin 18. The knife holder 3 is then removed by sliding the knife holder in a direction parallel to the knife 1, on the key portion 17. After the knife holder 3 is removed, the sub-assembly of the knife holder 3 and knife 1 may be quickly replaced by another sub-assembly having a resharpened knife or a new knife. The knife 1 requiring sharpening or replacement may be removed by first removing the screw 6 and then sliding the knife 1 out of the slot 3*e* with the bearing 4 and the bushing 5 being carried by the knife 1.

Figure 5:
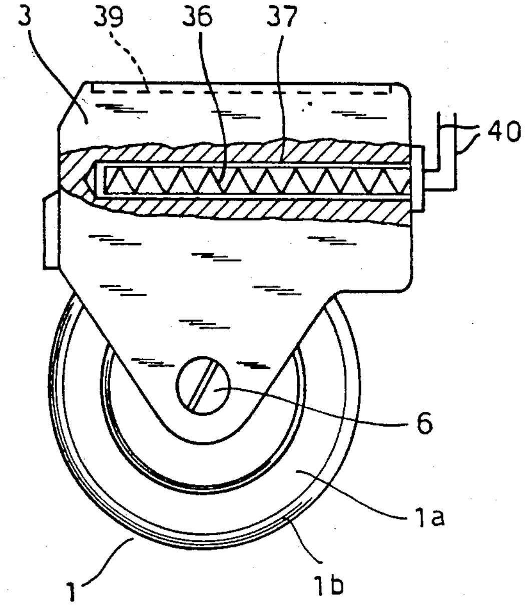
FIG. 5 is a side view in part section, of a knife holder constructed in accordance with a modification of the invention.
Figure 6:
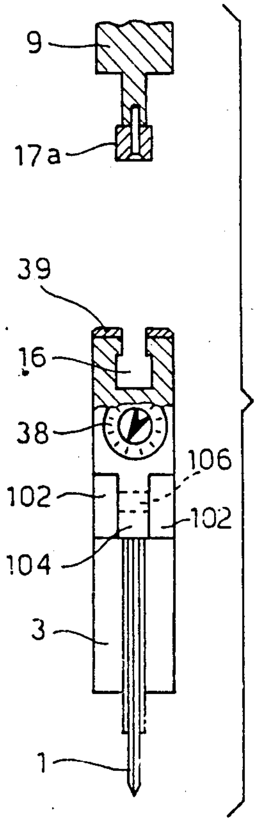
FIG. 6 is a front view in part section, of the knife holder of FIG. 5 and of a supporting member.

Referring to FIGS. 5 and 6, it is sometimes desirable for the knife 1 to be used for hot cutting a web of material. In this embodiment or modification, a knife holder 3 has an increased depth and it provided with a cylindrical hole or bore 37 which extends parallel to an undercut slot 16. An elongated rod type resistant heating element 36 is installed within the hole 37 and is connected by leads 40 to a suitable electrical power supply. Advantageously, the heating element 36 may be connected to a power supply by a thermally actuated switch control device or thermostat 38 to control the heating temperature of the knife holder. In this embodiment, the undercut slot 16 receives the mating track or key portion 17*a* of the base or intermediate support member 9 formed of a thermal insulating plastic or ceramic material. On the contrary, the undercut 16 may be formed within an intermediate portion of thermal insulating material, secured to the remaining portion of the knife holder 3 by a suitable cement. Thus when the heating element 36 is energized, the heat is primarily transferred through the knife holder 3 to the knife 1 so that the knife is heated for hot slitting the material. The thermal insulating portion between base member 9 and knife holder 3 limits the amount of heat which transfers to the supporting base member 9. The reference 39 indicates a further thermal insulating material disposed between members 3 and 9.

From the drawing and the above description, it is apparent that a web slitting knife unit constructed in accordance with the present invention, provides desirable features and advantages. For example, the rigid support of the slitting knife 1 by the clamped together walls 3*a*, 3*b* and the spacer bushing 5 of the knife holder 3 assures that the cutting edge 1a rotates precisely within a fixed plane and does not wobble or vary from the plane even after an extended period of use of the knife unit. In addition, the parallel spaced rods 10 and the precision bearings 10*a* assure precise linear movement of the base member 9 and the knife holder 3, and the key 34 within the slot 35 cooperates to maintain precision linear movement of the knife 1 when the piston 11 is extended. The supporting connecting rods 10 may also be spaced at an equal distance from a plane including the axis of the knife 1 and the longitudinal center of the piston 11 to assure that the forces exerted by the rods 10 are uniformally balanced both on the piston 11 and on the base member 9, knife holder 3 and knife 1.

The precision interfitting key portion 17 and slot 16 provide for convenient and quick removal of the knife holder 3 and knife 1, and the latch bolt or pin 18 assures that the knife holder 3 is precisely located with respect to the base member 9 in addition to being locked together. An additional feature is provided by the sliding clamp member 26 which provides for accomodating and gripping support bars 8 of various widths or having a different tapered surface 8*a*. Also, the embedded heating element 36 within the knife holder 3 provides for heating the knife 1 while limiting the heat transfer to the supporting base member 9 through the slot defining portion 114 of a thermal insulating material.

While the forms of knife units herein described constitute preferred embodiments of the invention, it is to be understood that the invention is not limited to these precise forms of knife units, and that changes may be made therein without departing from the scope and spirit of the invention as defined in the appended claims.

The invention having been thus described, the following is claimed:

1. A compact knife unit adapted for use in slitting a web of material, said unit including a body, means for securing said body to a support member, a knife holder having parallel, spaced apart walls defining a slot therebetween, a circular knife disposed within said slot and having means defining a center opening, knife support means for supporting said knife for rotation within said slot, and fluid actuated means operatively connected to said body and to said knife holder for moving said knife holder and said knife in a linear direction of movement, wherein said knife support means includes a spacer bushing and means for rigidly clamping said walls against said bushing thereby precisely spacing said walls relative to said knife and a bearing mounted on said spacer bushing and supporting said knife for precision rotation therearound, said fluid actuated means including a base member, said base member including sliding track means for slidably receiving said knife holder, said track means providing for removal of said knife holder and said knife from said base member in a direction traverse to said linear direction to provide for the convenient and quick replacement of said knife.

2. A knife unit as defined in claim 1, wherein said sliding track means connecting said knife holder to said base member comprises an undercut slot and a mating key connection providing for relative sliding movement, and releasable latch means for locking said key within said slot.

3. A knife unit as described in claim 1, wherein said means for securing said body to a support member comprise a non-rotating clamp member, an elongated screw extending through a portion of said body and supporting said clamp member for linear movement, and a key and slot connection of said clamp member to said body for guiding said clamp member during said linear movement of said clamp member and for preventing rotation of said clamp member with said screw.

4. A knife unit as defined in claim 1, wherein said means supporting said base member for said linear movement comprise a plurality of parallel spaced cylindrical support rods, and said fluid actuated means comprise an elongated piston connecting said support rods.

5. A knife unit as described in claim 4, wherein the axes of said support rods are spaced substantially equal distance from a parallel plane including the axis of said circular knife and the longitudinal center of said piston for balancing the forces acting on said base member and said knife holder and said knife.

6. A knife unit as described in claim 1 and including a key and slot connection of said knife holder to said body and extending parallel to said liner direction of movement to provide a precision guide for said knife holder and said knife.

7. A knife unit as described in claim 1 and comprising an electrical heating element positioned to heat said knife holder, and said sliding track means connecting said knife holder to said base member comprise a portion formed of a thermal insulating material.

8. A knife unit as described in claim 1, wherein said knife holder includes means for receiving a tool to facilitate convenient removal of said knife holder in said transverse direction.

9. A compact knife unit adapted for use in slitting a web of material, said unit including a body, means for securing said body to a support member, a knife holder having an upper portion including means defining a shaped portion and a lower portion having a pair of parallel spaced apart walls defining a slot therebetween, a circular knife rotatably disposed within said slot and having a center opening, a knife support mounted relative to said walls and extending through said opening for supporting said knife for rotation within said knife holder, knife holder support means operatively connected to said body for supporting said knife holder for movement in a linear direction, and fluid actuated means supported by said body and connected to said knife holder support means for moving said knife holder support means, said knife holder and said knife in said linear direction, wherein said knife support includes clamping means for pulling the walls together to precisely space and rigidly clamp said walls of said knife holder against a portion of said knife support provided between said walls to provide for precision rotation of said knife, said knife holder support means having an upper portion connected to said fluid actuated means and a lower portion including means defining a shaped portion to cooperate and slidingly mate with the shaped portion of said knife holder, means releasably connecting said upper portion of said knife holder to said knife holder support means and providing for removal of said knife holder and said knife therefrom in a direction transversely to said linear movement to provide for convenient and quick replacement of said knife.

10. A knife unit as defined in claim 11 wherein said shaped portion on said knife holder comprises an undercut slot and said shaped portion on said knife holder support means comprises a mating key connection providing for relative sliding movement, and releasable latch means to retain said key in said slot.

11. A knife unit as defined in claim 9 wherein said body includes a guide member for supporting said fluid actuating means, said knife holder support means and said knife holder, and guide means on said guide member, said knife holder support means and said knife holder, for guiding the knife holder support means and the knife holder in said linear direction.

12. A knife unit as defined in claim 11 in which said guide means for said knife holder support means comprises parallel spaced support rods connected to said knife holder support means, respectively to an elongated piston of said fluid actuated means, and tubular bearings in said guide member.

13. A knife unit as defined in claim 11 in which said guide means for said knife holder comprises slot and key guide connections between said guide member and said knife holder.

14. A knife unit as defined in claim 9 further including a spring biased latch member for securing said knife holder to said knife holder support means, and release means acting on the latch member for disengagement.

15. A knife unit as defined in claim 9, further comprising heating means in said knife holder.

16. A knife unit as defined in claim 15, in which said heating means are in the form of an electrical heating element connected to a thermally actuated switch control device.

17. A knife unit as described in claim 16 in which a thermal insulating material is disposed between said knife holder and said intermediate support member.

18. A knife unit as described in claim 9, in which the means for securing said guide member to said support bar comprise a clamping member, a screw extending through a threaded hole in said guide member, and engagable and disengagable pin connecting means between said screw and said clamping member, to provide for axial movement of the clamping member with the screw and for relative rotation.

19. A knife unit as defined in claim 9, wherein said clamping means comprises a threaded screw, and a spacer bushing mounted on said screw within said slot and being clamped between said walls by said screw.

20. A knife unit as defined in claim 19, wherein said screw has a flat head, and a antifriction bearing mounted on said bushing for rotatably supporting said knife.

21. A knife unit as defined in claim 9, wherein said means releasably connecting said knife holder to said knife holder support means comprises an undercut slot and mating key connection providing for relative sliding movement, and releasable latch means for restricting movement of said key within said slot.

22. A knife unit as described in claim 9, wherein said means for securing said body to a support member comprise a clamp member, an elongated screw extending through a portion of said body and supporting said clamp member for linear movement, and a key and slot connection of said clamp member to said body for guiding said clamp member during said linear movement of said clamp member and for preventing rotation of said clamp member with said screw.

23. A knife unit as defined in claim 9, wherein said means supporting said knife holder support means for said linear movement comprise a plurality of parallel spaced cylindrical support rods, and said fluid actuated means comprise an elongated piston connecting said support rods.

24. A knife unit as described in claim 23, wherein the axes of said support rods are spaced substantially equal distance from a parallel plane including the axis of said circular knife and the longitudinal center of said piston for balancing the forces acting on said knife holder support means, said knife holder and said knife.

25. A knife unit as defined in claim 9, wherein said means releasably connecting said knife holder to said knife holder support means comprises a linear track extending perpendicular to said linear direction of movement of said knife holder, and releasable latch means securing said knife holder to said knife holder support means.

26. A knife unit as described in claim 9 and including a key and slot connection of said knife holder to said body and extending parallel to said linear direction of movement to provide a precision guide for said knife holder and said knife.

27. A knife unit as described in claim 9 and comprising an electrical heating element positioned to heat said knife holder, and said means releasably connecting said knife holder to said knife holder support means comprise a thermal insulation material.

28. A knife unit as described in claim 9 and including a spring biased latch pin securing said knife holder to said knife holder support means, a release pin supported for axial movement by said knife holder support means in alignment with said latch pin, and a release lever pivotally supported by said knife holder support means and positioned for moving said release pin to depress said latch pin.

29. A knife unit as described in claim 9, wherein said knife holder includes means for receiving a tool to facilitate removal of said knife holder in said transverse direction.

* * * * *